Aug. 3, 1926.

J. F. CHARLTON 1,594,602

COURSE FINDER AND RADIO POSITION PLOTTER

Filed Jan. 10, 1925

WITNESS:

INVENTOR
John F. Charlton
BY

ATTORNEYS.

Patented Aug. 3, 1926.

1,594,602

UNITED STATES PATENT OFFICE.

JOHN F. CHARLTON, OF JENKINTOWN, PENNSYLVANIA.

COURSE FINDER AND RADIO POSITION PLOTTER.

Application filed January 10, 1925. Serial No. 1,538.

My invention relates to those nautical instruments by means of which, in connection with a chart, the course of the ship with reference to any point on the chart may be determined.

The ordinary instrument of this character, like that forming the subject-matter of this invention, involves the principle of a parallel ruler, and also requires, as my improved instrument does not, the adjustment of the same with reference to the compass rose on the chart.

The object of my invention is to simplify the construction of the instrument, to facilitate its adjustment, to guard against inaccuracies of adjustment, and to secure other advantages which will be apparent to those skilled in the art and some of which will be mentioned hereinafter.

In the drawings:—

Figure 1:
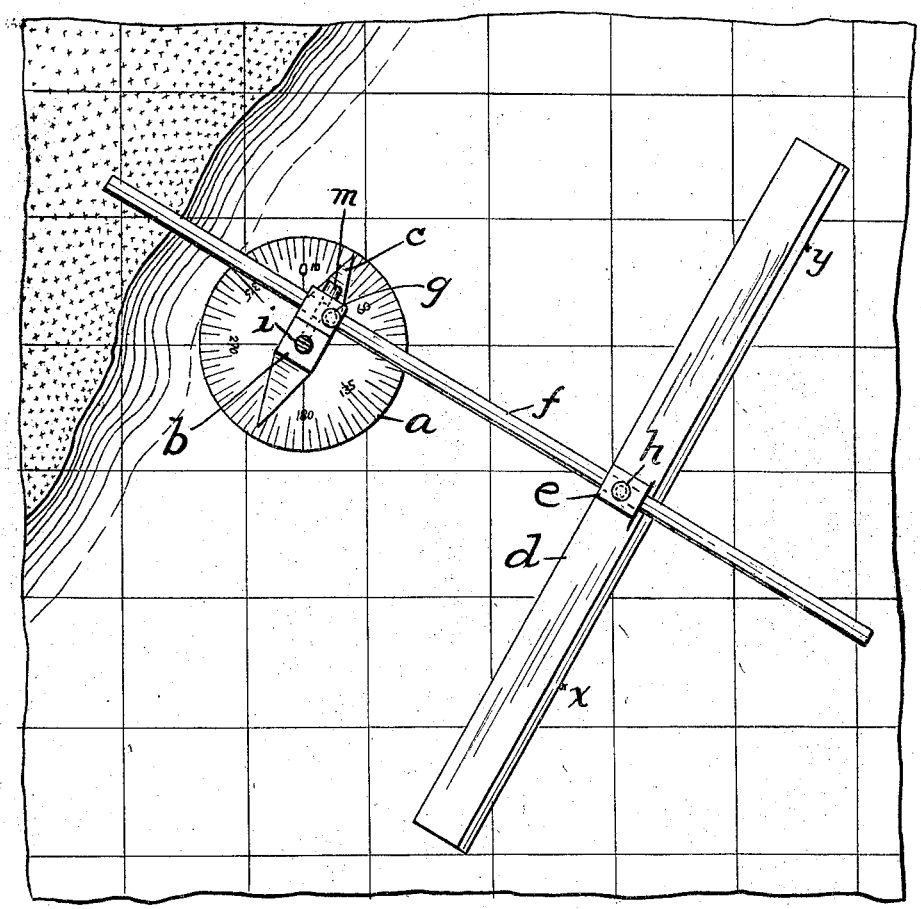
Fig. 1 is a plan view of the instrument applied to a chart.
Figure 2:
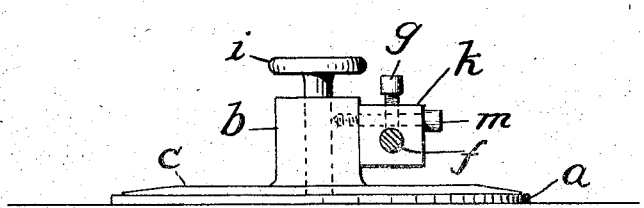
Fig. 2 is an enlarged sectional elevation of a part of the instrument.

On the center of a dial $a$, provided adjacent its circumference with a scale of degrees, is rotatably mounted a block $b$ carrying a pointer $c$. Alongside block $b$ is a block $k$. A pin $m$ extends through block $k$ and its end is threaded into block $b$. Block $k$ is provided with a hole whose axis extends at right angles to the direction of extension of the pointer.

A ruler $d$ carries, preferably integral with it, a block $e$ having a hole whose axis extends at right angles to the axis of the ruler.

Slidably extending through the holes in blocks $k$ and $e$, and having a neat fit therein, is a rod $f$.

The rod $f$ may be fixed in any adjusted position with relation to the block $k$ by means of a thumb-screw $g$. The rod $f$ may be fixed in any adjusted position with relation to the block $e$ by means of a thumb-screw $h$.

Projecting from the top of the block $b$ is a post with a hand-hold $i$.

It will be understood, from the above description, that the ruler $e$, in all adjusted positions, extends exactly parallel to the pointer $c$.

In operation, the device is laid flat on a chart and the dial $a$ is positioned so that the zero mark on its periphery registers with due north. If it be assumed that the ship's position is at point $x$ and that it is desired to direct the pointer $c$ toward point $y$, the ruler is shifted until its edge registers with points $x$ and $y$, the thumb-screws $g$ and $h$ being unscrewed to allow the rod $f$ to slide freely during the positioning of the ruler. The pointer $c$ is thereby turned into such position on the dial as to indicate accurately the deviation from due north of the point $y$ with relation to the ship. The thumb-screws $g$ and $h$ are then tightened to maintain the ruler $f$ and pointer $c$ in their adjusted positions.

One of the principal advantages of my invention is that the compass rose on the chart is not essential. The invention has other substantial advantages. The device can be moved over any part of the chart without danger of losing its bearing. The ruler can be adjusted to any position on the chart and instantly give a true course without danger of the slightest change of angle. There is no liability to warping or of indicating incorrect angles, which are characteristic defects of other instruments for the same purpose made of wood, or partly of wood and partly of metal. Radio bearings can instantly be laid off from one or more stations without referring to the compass rose on the chart. A double reading, that is, a reading of diametrically opposite degrees on the circumference of the dial, is possible with every adjustment of the ruler.

Having now fully described my invention, what I claim and desire to protect by Letters Patent is:—

1. A nautical instrument for determining directions and courses which comprises a dial provided with circumferential marks indicating degrees, a pointer centrally pivoted on the dial, a ruler adapted to be manually registered with points on a chart, and means connecting the pointer and ruler adapted to maintain them in parallelism but permitting the ruler to move relatively to the pointer at right angles to their direction of extension.

2. A nautical instrument for determining directions and courses which comprises a dial provided with circumferential marks indicating degrees, a pointer centrally pivoted on the dial, a ruler adapted to be manually registered with points on a chart, means connecting the pointer and ruler adapted to maintain them in parallelism but allowing them to move relatively one to the other at right angles to the direction of their extension, and means to lock the pointer and ruler against relative movement.

3. A nautical instrument for determining directions and courses which comprises a dial provided with circumferential divisional marks, a block and pointer carried by the dial and turnable about the center thereof, a ruler adapted to be manually registered with points on a chart, a block on the ruler, and a rod extending through holes in the blocks, the ruler being thereby slidable toward and from the pointer while maintaining parallelism therewith.

4. A nautical instrument for determining directions and courses which comprises a dial provided with circumferential divisional marks, a block and pointer carried by the dial and turnable about the center thereof, a ruler adapted to be manually registered with points on a chart, a block on the ruler, a rod extending through holes in the blocks and slidable relatively to both blocks, and means to secure the rod in fixed position of adjustment relatively to both blocks.

5. A nautical instrument for determining directions and courses which comprises a dial provided with circumferential divisional marks, a block and pointer pivotally mounted on the center of the dial, a block alongside the first block, a pin extending through the second block and engaging the first block, a ruler, a block on the ruler, a rod slidably extending through a hole in the second block and a hole in the block carried by the ruler, and means to secure the rod in fixed position relatively to both of the blocks through which it extends.

In testimony of which invention, I have hereunto set my hand, at Jenkintown, Montgomery Co., Pa., on this 12th day of December, 1924.

JOHN F. CHARLTON.